United States Patent
Shetty et al.

(10) Patent No.: US 10,977,134 B2
(45) Date of Patent: Apr. 13, 2021

(54) RESTORATION PROCESS TO RESTORE CORRUPTED DATA OF A VOLUME

(71) Applicant: NetApp, Inc., Sunnyvale, CA (US)

(72) Inventors: Rithin Shetty, Sunnyvale, CA (US); Vishwajith Shivappa, Mysore (IN); Paul Lockwood, Santa Cruz, CA (US); Pawan Saxena, Pleasanton, CA (US); Preethi Gopaulakrishnan, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 392 days.

(21) Appl. No.: 14/526,141

(22) Filed: Oct. 28, 2014

(65) Prior Publication Data

US 2016/0055224 A1    Feb. 25, 2016

(30) Foreign Application Priority Data

Aug. 19, 2014    (IN) .......................... 2343/DEL/2014

(51) Int. Cl.
*G06F 11/14* (2006.01)
*G06F 16/11* (2019.01)

(52) U.S. Cl.
CPC ...... *G06F 11/1469* (2013.01); *G06F 11/1451* (2013.01); *G06F 16/128* (2019.01); *G06F 2201/82* (2013.01)

(58) Field of Classification Search
CPC ......... G06F 17/30286; G06F 17/30575; G06F 3/0601; G06F 11/1451; H04L 29/0854
USPC ....................................................... 707/624
See application file for complete search history.

(56) References Cited

U.S. PATENT DOCUMENTS

| 5,202,887 | A | * | 4/1993 | Ueno .................. G06F 11/2071 714/5.1 |
| 5,819,292 | A | | 10/1998 | Hitz et al. |
| 7,409,494 | B2 | | 8/2008 | Edwards et al. |
| 7,464,238 | B1 | * | 12/2008 | Yadav ................. G06F 11/1456 711/114 |
| 7,475,098 | B2 | | 1/2009 | Patterson et al. |
| 7,516,285 | B1 | * | 4/2009 | Haynes ............. G06F 17/30197 711/162 |
| 7,653,682 | B2 | * | 1/2010 | Erasani ............... G06F 11/0709 709/201 |

(Continued)

FOREIGN PATENT DOCUMENTS

EP    1882223 A2 *    1/2008    .......... G06F 11/1435

OTHER PUBLICATIONS

Parasuraman, May 2000, A Model for Types and Levels of Human Interaction with Automation vol. 30, No. 3, 286-287, and 294 (Year: 2000).*

(Continued)

*Primary Examiner* — Hares Jami
*Assistant Examiner* — Andrew N Ho
(74) *Attorney, Agent, or Firm* — Cooper Legal Group, LLC

(57) ABSTRACT

A system and method for efficiently restoring one or more data containers is provided. A common persistent consistency point image (PCPI) is identified between a source and a destination storage systems prior to the destination storage system performing a rollback operation to the commonly identified PCPI. Differential data is then transmitted from the source storage system in a line efficient manner to the destination storage system.

20 Claims, 12 Drawing Sheets

(56) References Cited

U.S. PATENT DOCUMENTS

| | | | |
|---|---|---|---|
| 7,685,388 B1* | 3/2010 | Jiang | G06F 11/1451 711/162 |
| 7,827,350 B1* | 11/2010 | Jiang | G06F 11/1469 707/639 |
| 8,099,571 B1 | 1/2012 | Driscoll et al. | |
| 8,260,747 B2* | 9/2012 | Wu | G06F 11/1458 707/644 |
| 9,052,833 B2* | 6/2015 | Petersen | G06F 3/065 |
| 2003/0182312 A1* | 9/2003 | Chen | G06F 11/1435 707/200 |
| 2003/0182313 A1* | 9/2003 | Federwisch | G06F 11/2066 707/200 |
| 2003/0182330 A1* | 9/2003 | Manley | G06F 17/30067 707/205 |
| 2005/0138089 A1* | 6/2005 | Kasai | G06F 11/1464 |
| 2006/0184587 A1* | 8/2006 | Federwisch | G06F 11/1451 707/200 |
| 2007/0022138 A1* | 1/2007 | Erasani | G06F 11/0709 707/104.1 |
| 2008/0281879 A1* | 11/2008 | Kawamura | G06F 11/1469 |
| 2010/0325377 A1* | 12/2010 | Lango | G06F 16/10 711/162 |
| 2011/0035357 A1* | 2/2011 | Ting | G06F 11/1435 707/634 |
| 2011/0225359 A1* | 9/2011 | Kulkarni | G06F 3/0607 711/114 |
| 2011/0289344 A1* | 11/2011 | Bae | G06F 11/181 714/4.2 |
| 2012/0072659 A1* | 3/2012 | Wade | G06F 11/1453 711/112 |
| 2012/0136832 A1* | 5/2012 | Sadhwani | G06F 11/1469 707/640 |
| 2013/0073519 A1 | 3/2013 | Lewis et al. | |

OTHER PUBLICATIONS

Deshmukh, Vijay, U.S. Appl. No. 13/237,742, entitled Detection and Handling of Namespace Changes in a Data Replication System, filed Sep. 20, 2011, 49 Pages.

* cited by examiner

RESTORATION PROCESS TO RESTORE CORRUPTED DATA OF A VOLUME

RELATED APPLICATION

The present application claims priority to Indian patent application entitled SYSTEM AND METHOD FOR EFFICIENT BLOCK LEVEL GRANULAR REPLICATION the application of which was filed by Shetty et al. on Aug. 19, 2014 and accorded Indian Application No. 2343/DEL/2014.

BACKGROUND

1. Technical Field

The present disclosure relates to storage systems and, more specifically, to efficient block level granular replication in storage systems.

2. Background Information

A storage system typically includes one or more storage devices, such as disks, into which information (i.e. data) may be entered, and from which data may be obtained, as desired. The storage system may logically organize the data stored on the devices as data containers, such as files, logical units (luns), and/or aggregates having one or more volumes that hold files and/or luns. The storage system may mirror its data to a second storage system, that may be a specialized backup storage system for disaster recover purposes.

In the event of a disaster resulting in loss of data at the storage system, the storage system may restore the data from the second storage system. Illustratively, the entire data set, such as a volume or file system will be restored. However, such restoration procedures typically require substantial amounts of time due to the volume of data involved, e.g., terabytes. This may result in time when data is not available for clients to access. As error conditions often only damage part of the data, e.g., a few files and/or luns, it is often unnecessary to restore the entire data set from a backup with the concomitant time delays.

BRIEF DESCRIPTION OF THE DRAWINGS

The above and further advantages of the subject matter described herein may be better understood by referring to the following description in conjunction with the accompanying drawings in which like reference numerals indicate identically or functionally similar elements, of which.

DESCRIPTION

Overview

A system and method for efficiently replicating one or more data containers is provided. In one aspect, the replication technique is utilized for restoration purposes. However, it should be noted that the principles described herein may be used for replication, copying, backup, etc. As such, the description of restoration should be taken as exemplary only. In response to detecting that one or more data containers on a destination storage system have become corrupted and/or lost data, a restoration procedure is initialized. The restoration procedure provides granular restoration of data containers. That is, the restoration procedure may restore one or more files/luns while maintaining the remainder of the volume available for read/write operations. A control module executing on the destination interfaces with a control module executing on the source storage system to determine whether the source storage system has the required data containers. Should the source storage system have the required data containers, the source and destination storage systems then exchange information to identify a common persistent consistency point image (PCPI). The destination storage system then fences the data container to be restored and creates a rollback PCPI. Once the rollback PCPI has been created, the destination storage system performs a local rollback operation directed to the data container.

The source storage system then transfers data relating to the to be restored one or more data containers to the destination storage system using a line efficient technique. Once the data transfer has been completed, the destination storage system clears the fence of the data containers and begins processing data access operations directed to the data container.

Storage System Environment

Figure 1:
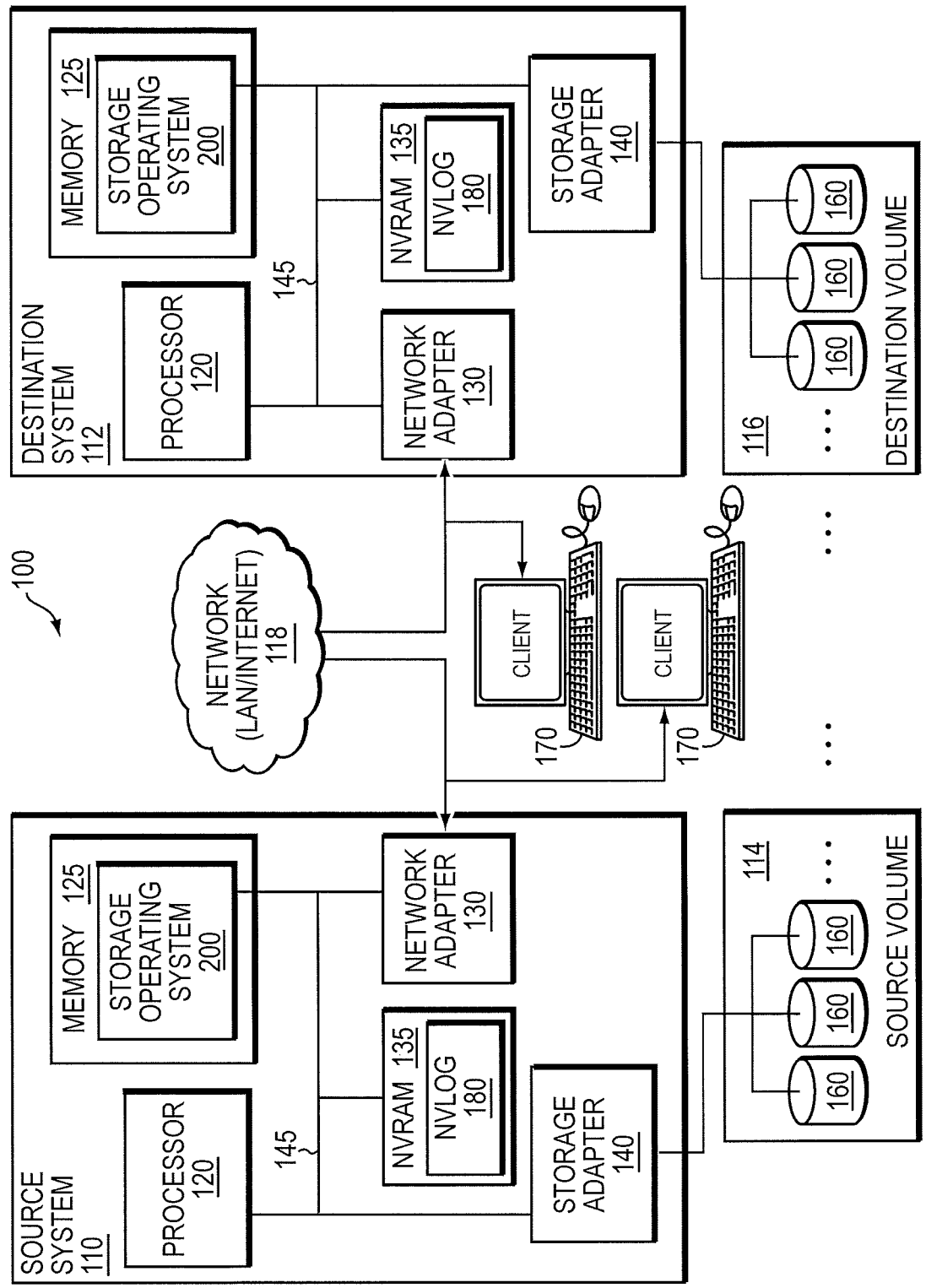
FIG. 1 is a schematic block diagram of a storage system and backup server.

FIG. 1 is a schematic block diagram of a storage system environment 100 that includes a pair of interconnected storage systems including a source storage system 110 and a destination storage system 112. For the purposes of this description, the source storage system is a networked computer that manages storage one or more source volumes 114, each having an array of storage disks 160 (described further below). Likewise, the destination storage system 112 manages one or more destination volumes 116, also comprising arrays of disks 160. It should be noted that the description of source and destination volumes 114, 116 should be taken for illustrative purposes only. Storage for the source and destination systems 110, 112 may comprise volumes, aggregates, or other storage containers. As such, the description of volumes 114,116 should be viewed as illustrative only. The source and destination storage systems are linked via a network 118 that can comprise a local or wide area network, such as the well-known Internet.

In the particular example of a pair of networked source and destination storage systems, each storage system 110 and 112 can be any type of special-purpose computer (e.g., server) or general-purpose computer, including a standalone computer. The source and destination storage systems 110, 112 each comprise a processor 120, a memory 125, a network adapter 130 and a storage adapter 140 interconnected by a system bus 145. Each storage system 110, 112 also includes a storage operating system 200 (FIG. 2) that implements a file system to logically organize the information as a hierarchical structure of directories and files on the disks.

It will be understood to those skilled in the art that the exemplary technique described herein may apply to any type of special-purpose computer (e.g., file serving appliance) or general-purpose computer, including a standalone computer, embodied as a storage system. Moreover, the teachings of this disclosure can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 125 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 200, portions of which are typically resident in memory and executed by the processing elements, functionally organizes the storage system by, inter alia, invoking storage operations in support of a file service implemented by the storage system. It will be apparent to those skilled in the art that other processing and memory means, including various computer-readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network. The network adapter 130 may include one or more ports adapted to couple the storage system to the clients over a network, which may, for example, take the form of an Ethernet network or a FC network. As such, the network adapter 130 may include a network interface controller (NIC) that may include a TCP/IP offload engine (TOE) and/or an iSCSI host bus adapter (HBA). Likewise, the storage adapter 140 may include one or more ports adapted to couple the storage system to storage devices 160. The storage adapter 140 cooperates with the storage operating system 200 executing on the storage system to service operations (e.g. data access requests) directed to the storage devices 160. In one implementation, the storage adapter takes the form of a FC host bus adapter (HBA).

The storage adapter 140 cooperates with the storage operating system 200 executing on the storage system to access information. The information may be stored on the disks 160 that are attached, via the storage adapter 140 to each storage system 110, 112 or other node of a storage system as defined herein. The storage adapter 140 includes input/output (I/O) interface circuitry that couples to the disks over an I/O interconnect arrangement, such as a conventional high-performance, Fibre Channel serial link topology. The disks 160 are illustratively arranged into a plurality of volumes (for example, source volumes 114 and destination volumes 116), in which each volume has a file system associated therewith. The volumes each include one or more disks 160. As noted above, the description of discs 160 organized as volumes 114, 116 to be taken as exemplary only. Further, the use of discs 160 should be taken as exemplary only. The present disclosure may be utilized using any form of persistent storage medium. As such, the description of the use of discs 160 should be taken as exemplary only. Further, while the subject matter of the disclosure is written in terms of discs 160 being organized in two volumes 114, 116, it is expressly contemplated that storage devices may be organized into other data constructs. As such, any description of volumes taken as exemplary only. More generally, the present disclosure may utilize any form of logical data container that may be utilized in accordance with the teachings of the present disclosure.

In one exemplary storage system implementation, each storage system 110, 112 can include a nonvolatile random access memory (NVRAM) 135 that provides fault-tolerant backup of data, enabling the integrity of storage system transactions to survive a service interruption based upon a power failure, or other fault.

Storage Operating System

To facilitate access to the disks 130, the storage operating system 200 implements a file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

The storage operating system is illustratively the NetApp® Data ONTAP® operating system available from NetApp®, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this disclosure.

Figure 2:
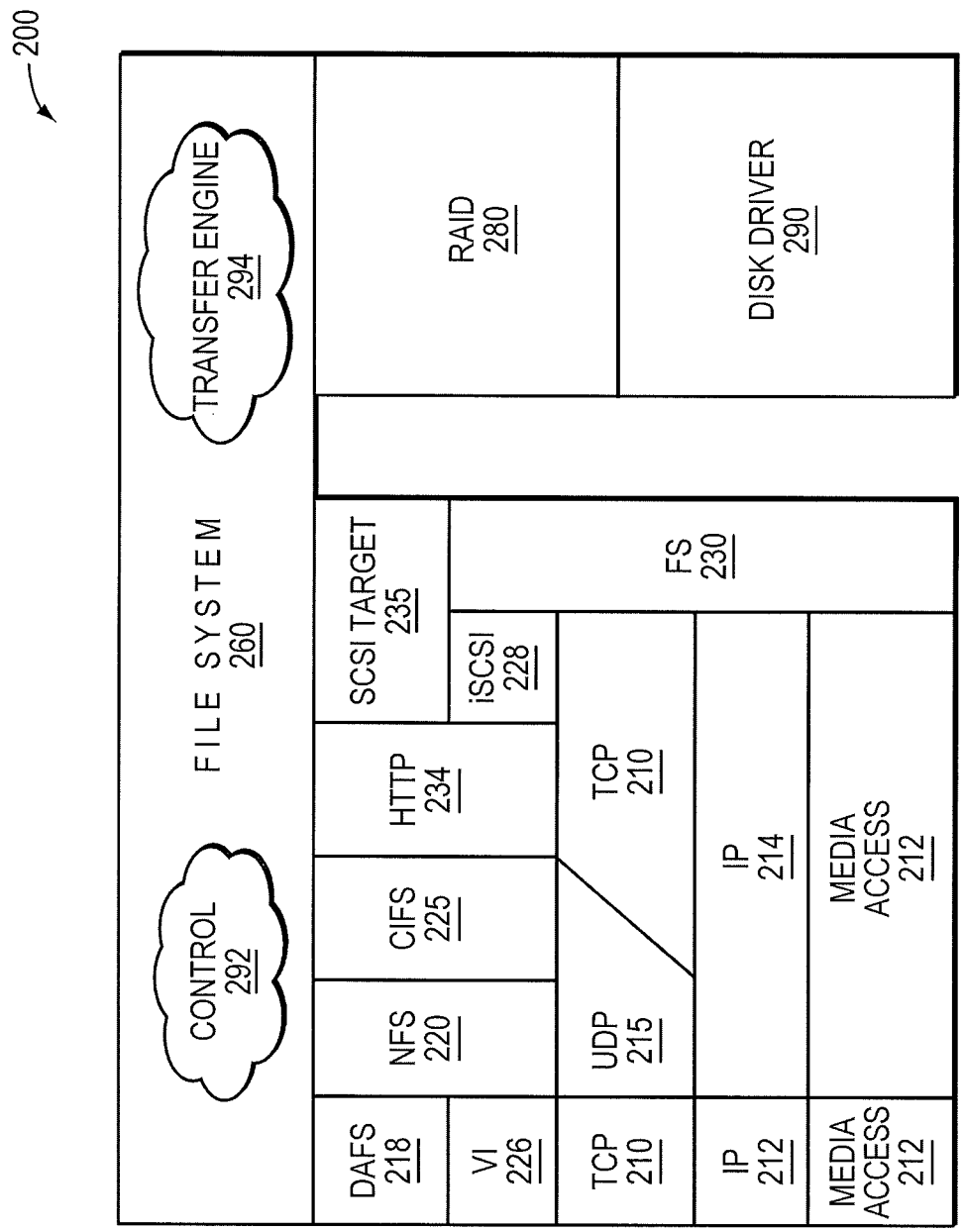
FIG. 2 is a schematic block diagram of an exemplary storage operating system.

FIG. 2 is a schematic block diagram of an exemplary storage operating system 200. The storage operating system comprises a series of software layers organized to form an integrated network protocol stack or, more generally, a multi-protocol engine that provides data paths for access to information stored on the storage system using block and file access protocols. The multi-protocol engine includes a media access layer 212 of network drivers (e.g., gigabit Ethernet drivers) that interfaces to network protocol layers, such as the IP layer 214 and its supporting transport mechanisms, the TCP layer 216 and the User Datagram Protocol (UDP) layer 215. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218. An iSCSI driver layer 228 provides block protocol access over the TCP/IP network protocol layers, while a FC driver layer 230 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 200 includes a series of software layers organized to form a storage server that provides data paths for accessing information stored on the disks 160. To that end, the storage server includes a file system module 260, a RAID system module 280 and a disk driver system module 290. The RAID system 280 manages the storage and retrieval of information to and from the volumes/disks in accordance with I/O operations, while the disk driver system 290 implements a disk access protocol such as, e.g., the SCSI protocol. The file system 260 implements a virtualization system of the storage operating system 200 through the interaction with one or more virtualization modules illustratively embodied as, e.g., a virtual disk (vdisk) module (not shown) and a SCSI target module 235 in response to a user (system administrator) issuing commands to the node 200. The SCSI target module 235 is generally disposed between the FC and iSCSI drivers 228, 230 and the file system 260 to provide a translation layer of the virtualization system between the block (lun) space and the file system space, where luns are represented as blocks.

The file system 260 is illustratively a message-based system that provides logical volume management capabilities for use in access to the information stored on the storage devices, such as disks. That is, in addition to providing file system semantics, the file system 260 provides functions normally associated with a volume manager. These functions include (i) aggregation of the disks, (ii) aggregation of storage bandwidth of the disks, and (iii) reliability guarantees, such as mirroring and/or parity (RAID). The file system 260 illustratively implements a file system having an on-disk format representation that is block-based using, e.g., 4 kilobyte (KB) blocks and using index nodes ("inodes") to identify files and file attributes (such as creation time, access permissions, size and block location). The file system 260 uses files to store meta-data describing the layout of its file system; these meta-data files include, among others, an inode file. A file handle, i.e., an identifier that includes an inode number, is used to retrieve an inode from disk.

Broadly stated, all inodes of the illustrative file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Illustratively, within the file system 260 is a control module 292 and a transfer engine 294. In accordance with an example of the present disclosure, the control module 292 manages the restoration of one or more data containers. Illustratively, the control module may interface with the transfer engine 294 to transfer data from the source to the destination storage systems. Further, the control module 292 will operatively interface with its counterpart control module operating on the other storage system to perform such actions as identifying the most recent persistent consistency point image, etc. While the control module 292 and transfer engine 94 are shown as part of the file system 260, it should be noted that in alternative aspects of the disclosure, the functionality may be implemented in differing modules. As such, the description of control module 292 and transfer engine 294 being located as part of the file system 260 should be taken as exemplary only.

As used herein, the term "storage operating system" generally refers to the computer-executable code operable on a computer to perform a storage function that manages data access and may, in the case of a storage system, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., storage system, storage system or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

The in-core and on-disk format structures of an exemplary file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

File System Layout

Figure 3:
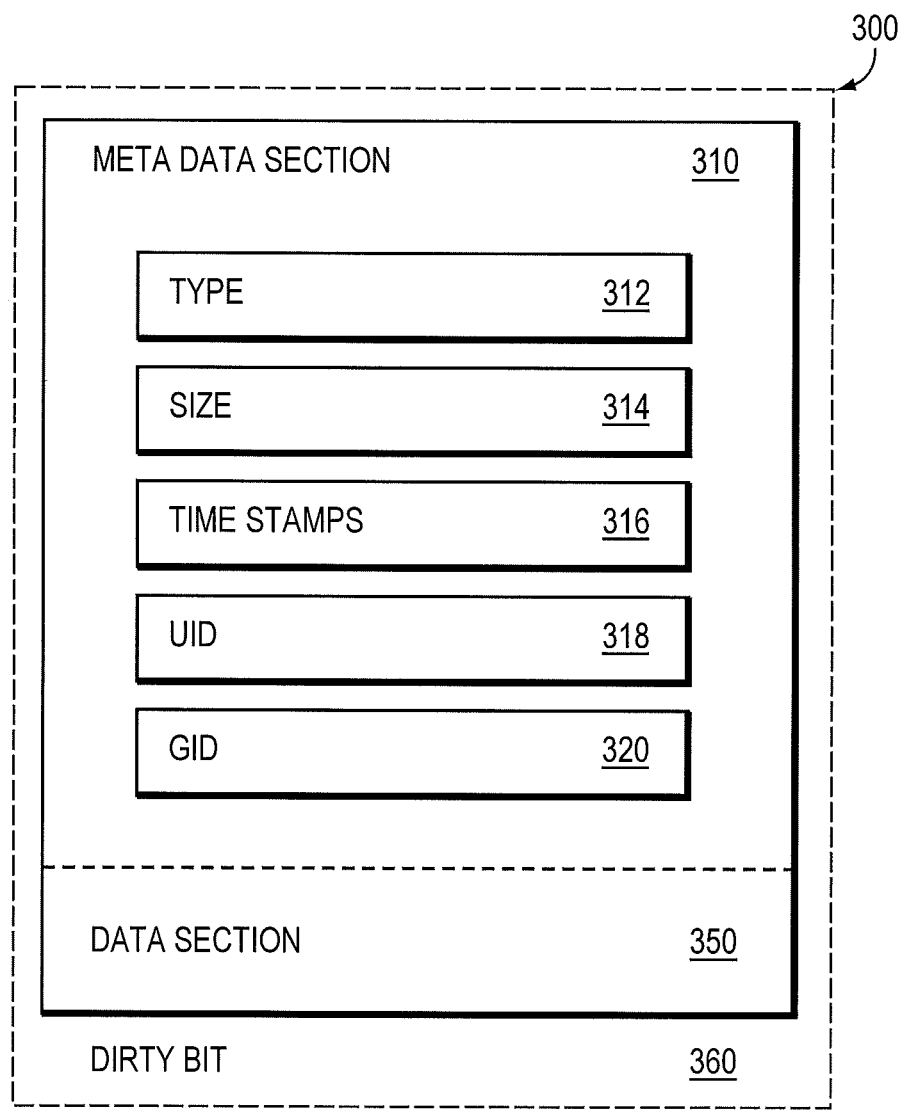
FIG. 3 is a schematic block diagram of an exemplary inode.

A file (or other data container) is illustratively represented in the file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file, and ownership, e.g., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 may include a representation of the data associated with the file.

The data section 350 of a regular on-disk inode may include file system data or pointers, the latter referencing 4 KB data blocks on disk used to store the file system data. Each pointer is preferably a logical vbn to facilitate efficiency among the file system and the RAID system 280 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 130 into the buffer cache 170.

When an on-disk inode (or block) is loaded from disk 160, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk.

Figure 4:
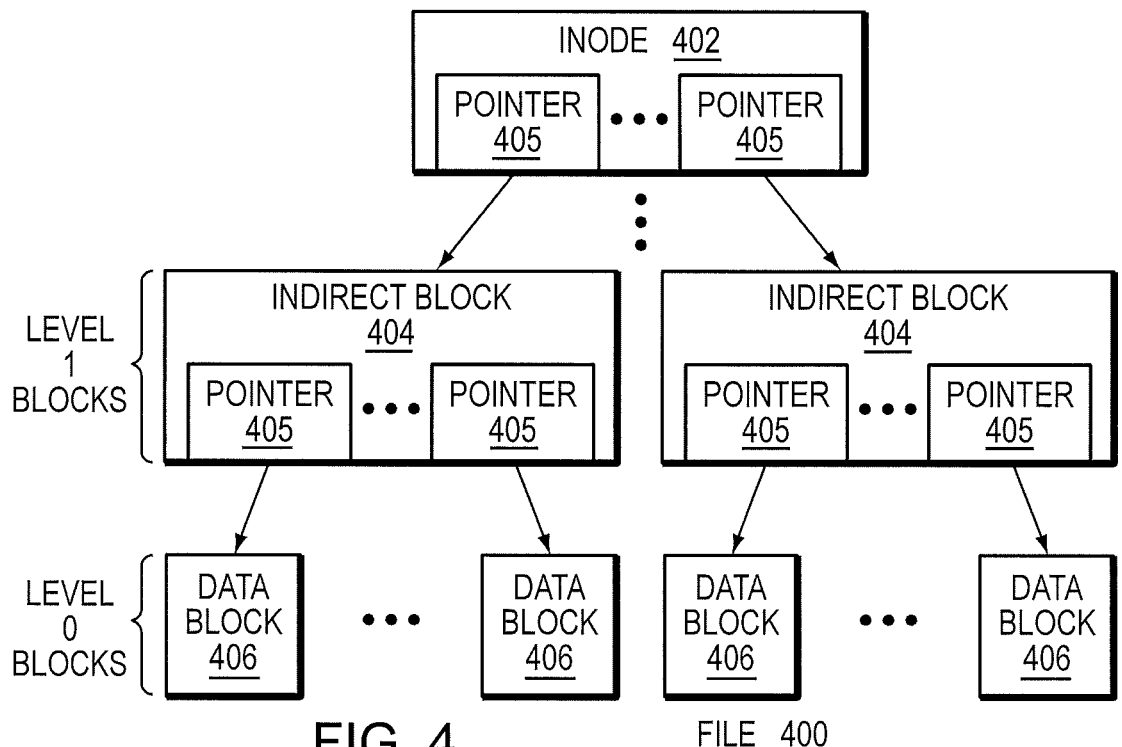
FIG. 4 is a schematic block diagram of an exemplary flexible volume.

FIG. 4 is a schematic block diagram of an embodiment of a buffer tree of a file. The buffer tree is an internal representation of blocks for a file (e.g., file 400) loaded into the memory 125 and maintained by the file system 260. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on disks.

Illustratively, the file system layout apportions an underlying physical volume into one or more virtual volumes (or flexible volume) of a storage system. An example of such a file system layout is described in U.S. Pat. No. 7,409,494 titled Extension of Write Anywhere File System Layout, by John K. Edwards et al. and assigned to Network Appliance, Inc., issued on Aug. 5, 2008. The underlying physical volume is an aggregate comprising one or more groups of disks, such as RAID groups, of a storage system. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 400) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn occurs at the file system/RAID system boundary of the storage operating system 200.

Figure 5:
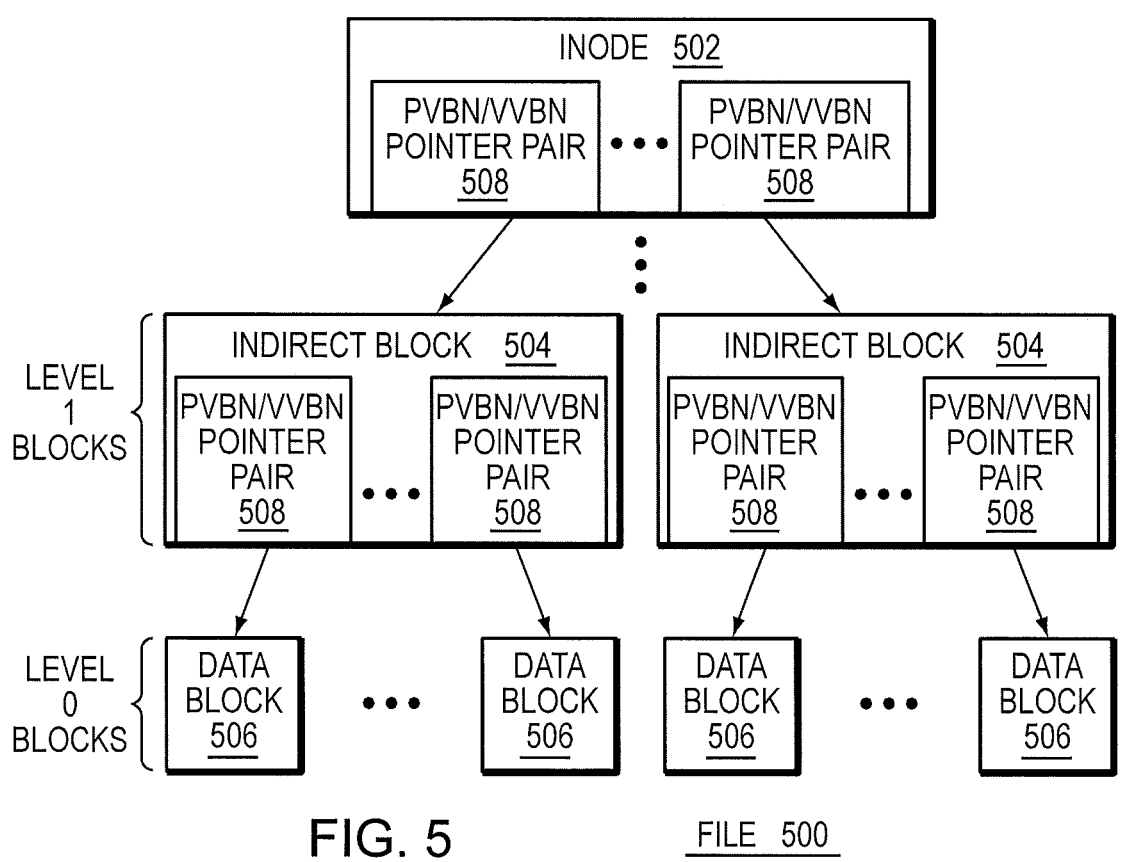
FIG. 5 is a schematic block diagram of an exemplary flexible volume.

In an illustrative dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative embodiment of a buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the flexible volume. The use of pvbns as block pointers 508 in the indirect blocks 504 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 6:
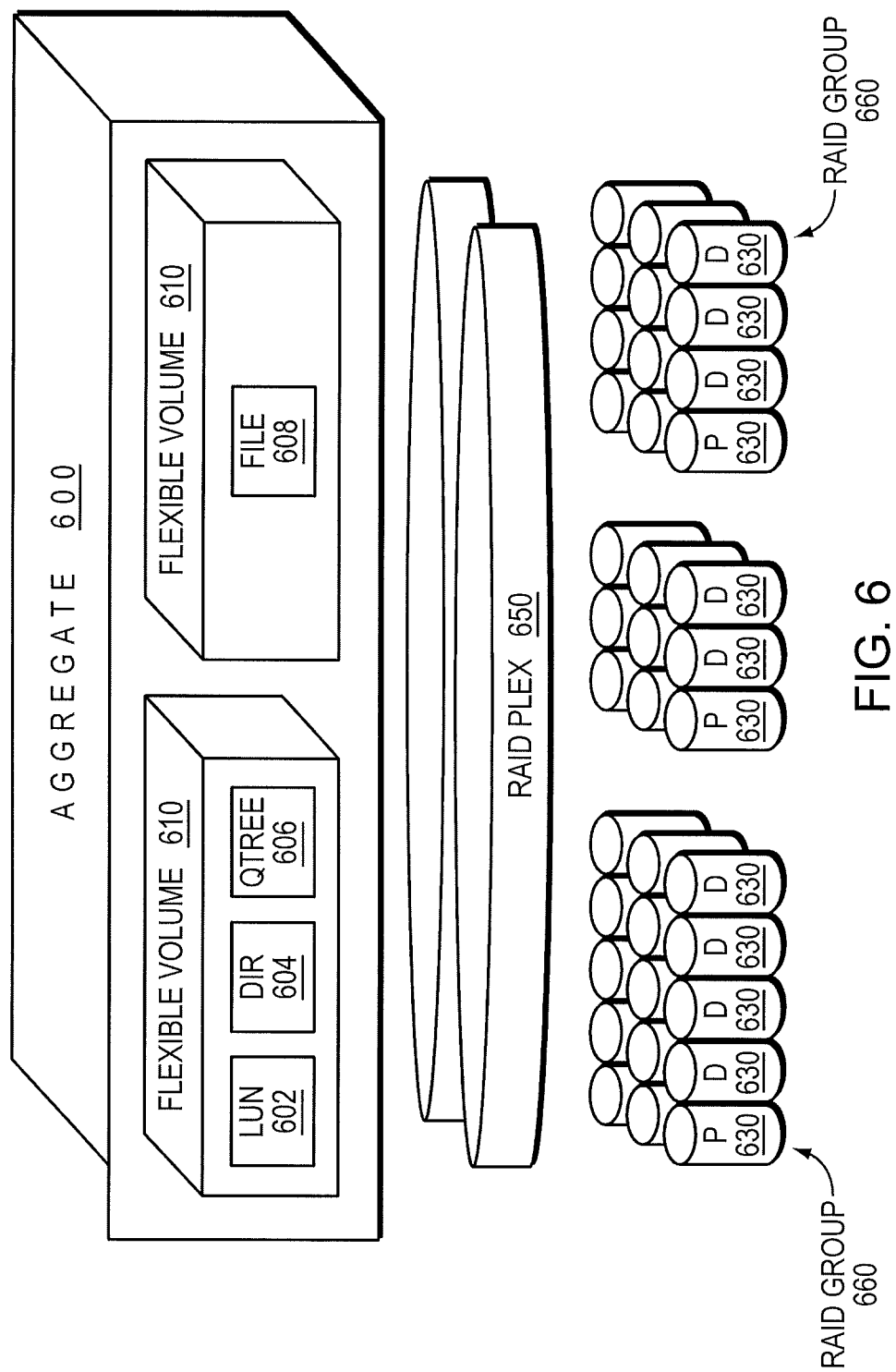
FIG. 6 is a schematic block diagram of an aggregate.

FIG. 6 is a schematic block diagram of an embodiment of an aggregate 600 that may be advantageously used with the present invention. Luns (blocks) 602, directories 604, qtrees 606 and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 610 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 7:
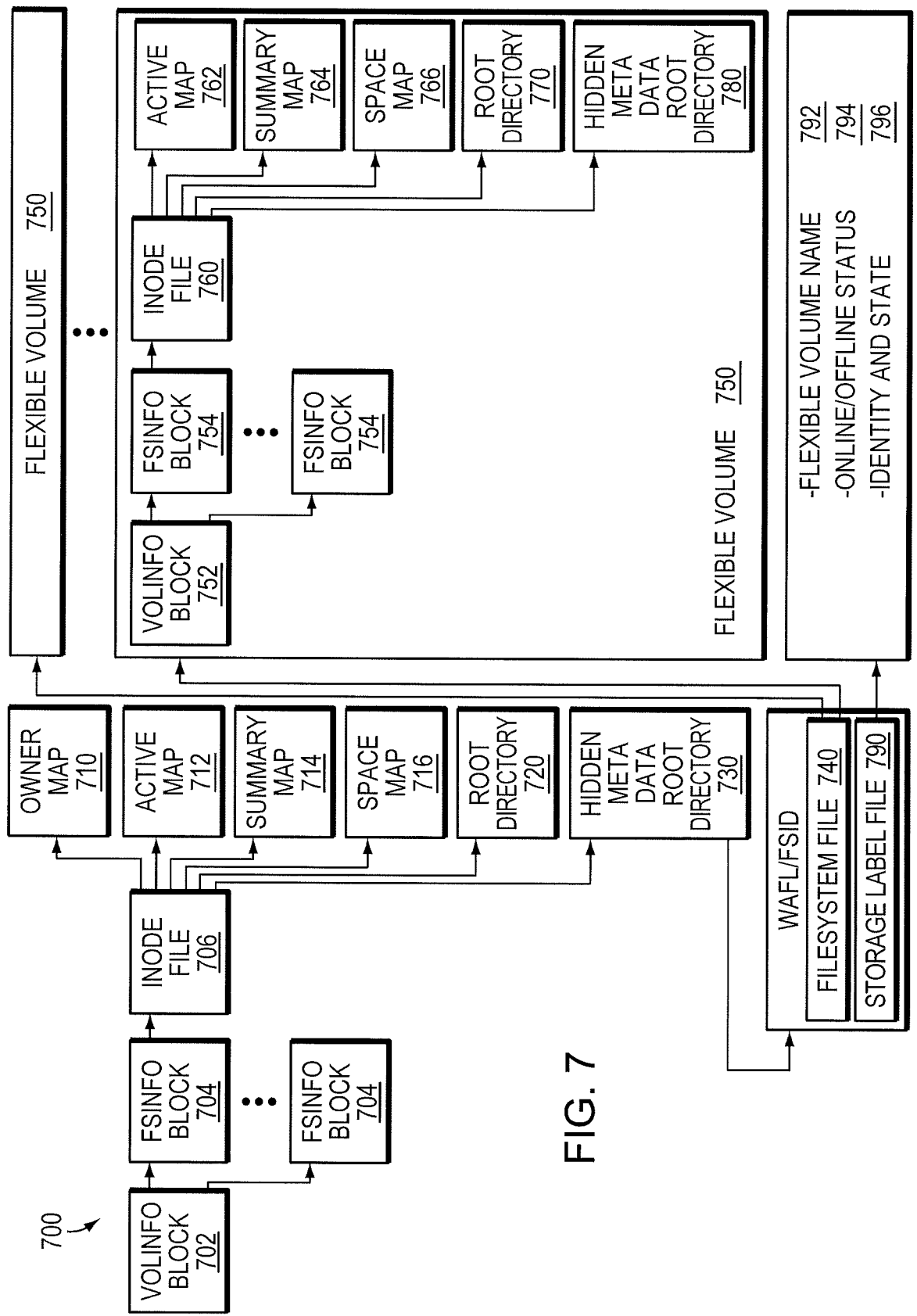
FIG. 7 is an exemplary block diagram of an on-disk structure of an aggregate.

FIG. 7 is a schematic block diagram of an on-disk representation of an aggregate 700. The storage operating system 300, e.g., the RAID system 380, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special meta-data files. The inode file 706 further includes a root directory 720 and a "hidden" meta-data root directory 730, the latter of which includes a namespace having files related to a flexible volume in which users cannot "see" the files. The hidden meta-data root directory includes the WAFL/fsid/directory structure that contains filesystem file 740 and storage label file 790. Note that root directory 720 in the aggregate is empty; all files related to the aggregate are organized within the hidden meta-data root directory 730.

In addition to being embodied as a container file having level 1 blocks organized as a container map, the filesystem file 740 includes block pointers that reference various file systems embodied as flexible volumes 750. The aggregate 700 maintains these flexible volumes 750 at special reserved inode numbers. Each flexible volume 750 also has special reserved inode numbers within its flexible volume space that are used for, among other things, the block allocation bitmap structures. As noted, the block allocation bitmap structures, e.g., active map 762, summary map 764 and space map 766, are located in each flexible volume.

Specifically, each flexible volume 750 has the same inode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot, along with the active file system of the flexible volume. Each fsinfo block, in turn, points to an inode file 760 that, as noted, has the same inode structure/content as the aggregate with the exceptions noted above. Each flexible volume 750 has its own inode file 760 and distinct inode space with corresponding inode numbers, as well as its own root (fsid) directory 770 and subdirectories of files that can be exported separately from other flexible volumes.

The storage label file 790 contained within the hidden meta-data root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated flexible volume 750, the online/offline status 794 of the flexible volume, and other identity and state information 796 of the associated flexible volume (whether it is in the process of being created or destroyed).

Persistent Consistency Point Images

Certain known examples of file systems are capable of generating a persistent consistency point image (PCPI) of the file system or a portion thereof. PCPIs and the PCPI procedure are further described in the above referenced U.S. Pat. No. 5,819,292. A PCPI is a read-only, point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken.

PCPIs can be utilized as a form of backups for an active file system. To provide for improved data retrieval and restoration, PCPIs should be copied to another file system different than the volume or file system on which the PCPI was generated. In one known example, a backup storage system is utilized to store PCPIs and manage a collection of PCPIs according to a user defined set of options. Backup storage systems are described in further detail in U.S. Pat. No. 7,475,098 entitled SYSTEM AND METHOD FOR MANAGING A PLURALITY OF SNAPSHOTS, by Hugo Patterson et. al., issued Jan. 6, 2009, which is hereby incorporated by reference.

A file system may support multiple PCPIs that are generally created on a regular schedule. Without limiting the generality of the term, each PCPI illustratively refers to a copy of the file system that diverges from the active file system over time as the active file system is modified. In the case of a write-anywhere file system, the active file system diverges from the PCPIs since the PCPIs stay in place as the active file system is written to new disk locations. Each PCPI is a restorable version of the storage element (e.g., the active file system) created at a predetermined point in time and, as noted, is "read-only" accessible and "space-conservative". Space conservative denotes that common parts of the storage element in multiple PCPIs share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. Broadly stated, a PCPI is stored on-disk along with the active file system, and is loaded into the memory of the storage system as requested by the storage operating system.

Figure 8:
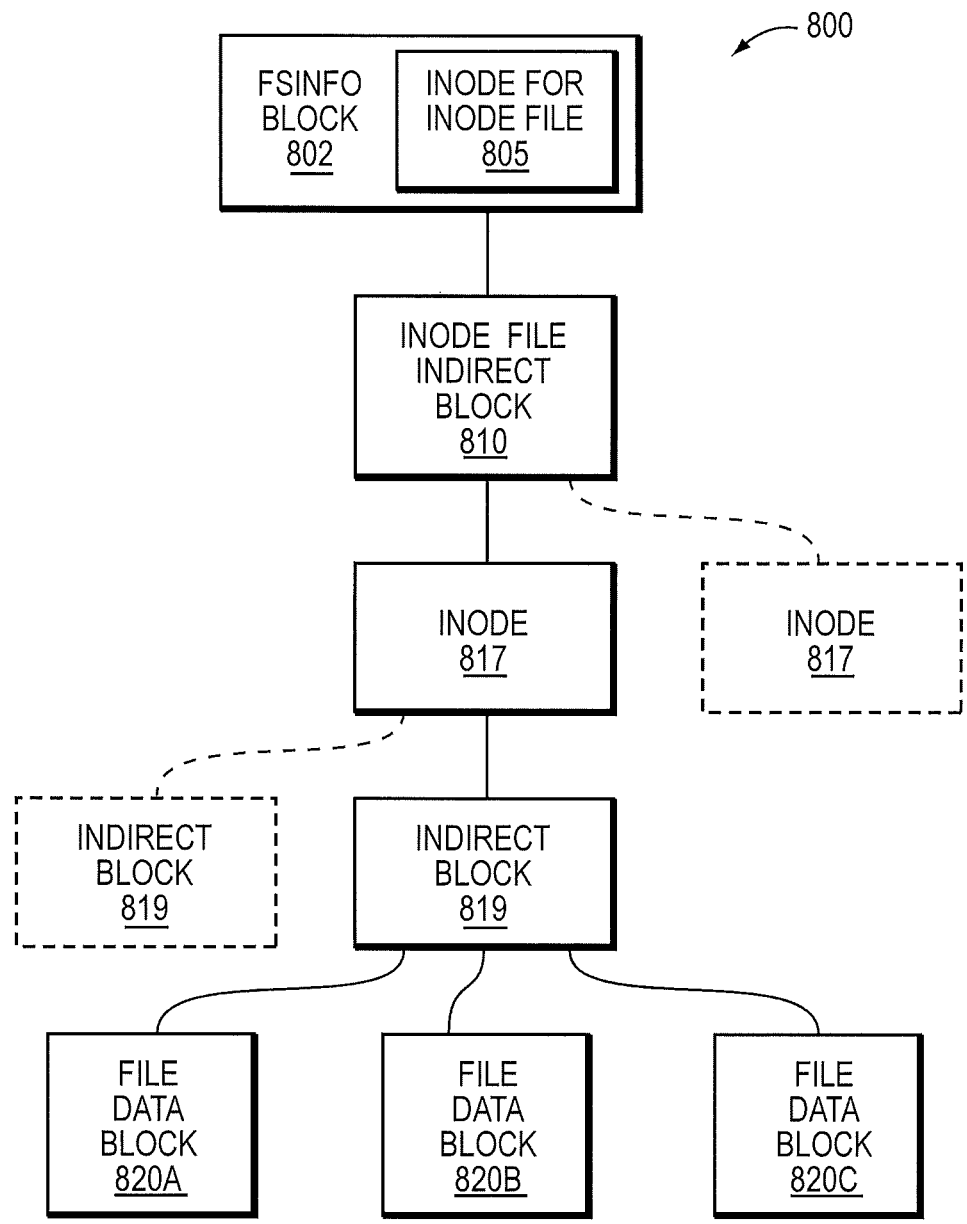
FIG. 8 is a diagram showing a buffer tree.

The on-disk organization of the PCPI and the active file system can be understood from the following description of an exemplary file system inode structure 800 shown in FIG. 8. A file system information (fsinfo) block 802 includes the inode for an inode file 805 which contains information describing the inode file associated with a file system. In this exemplary file system inode structure, the inode for the inode file 805 contains a pointer that references (points to) an inode file indirect block 810. The inode file indirect block 810 contains a set of pointers that reference inode file blocks, each of which contains an array of inodes 817 that, in turn, contain pointers to indirect blocks 819. The indirect blocks 819 include pointers to file data blocks 820A, 820B and 820C. Each of the file data blocks 820(A-C) is capable of storing, e.g., 4 kilobytes (KB) of data.

Figure 9:
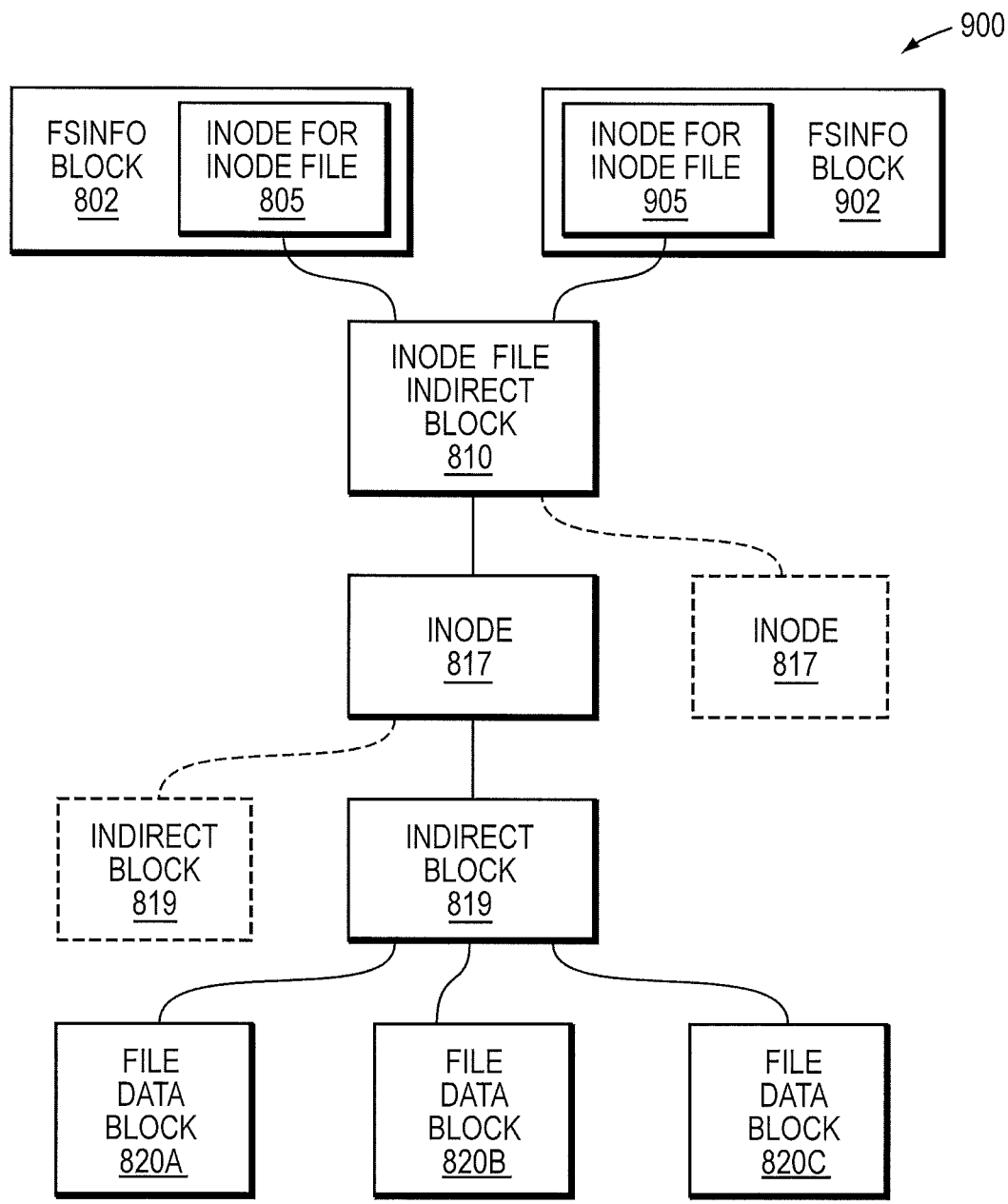
FIG. 9 is a diagram showing the creation of a persistent consistency point image (PCPI)
Figure 10:
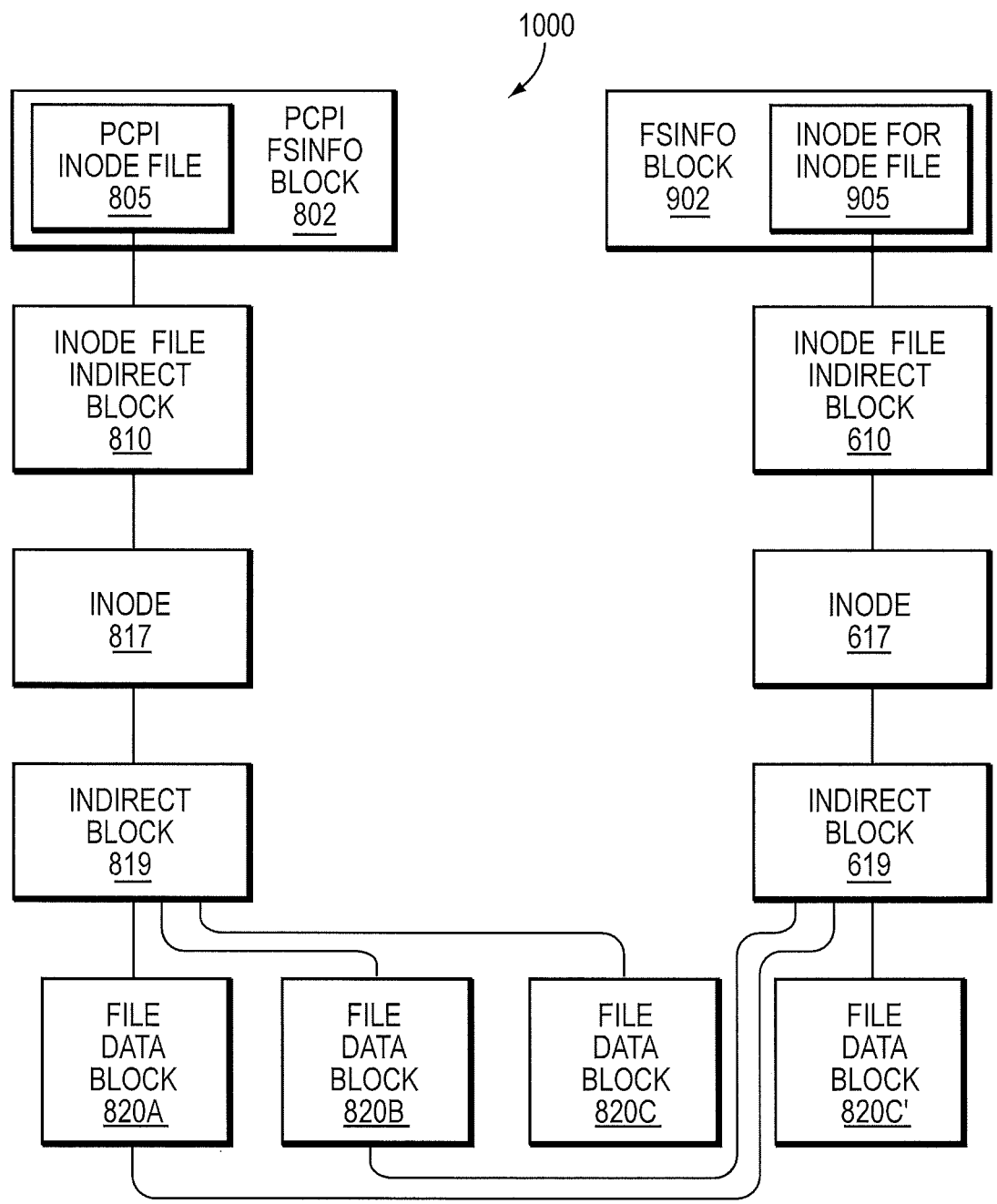
FIG. 10 is a diagram showing writing a new file system information (fsinfo) block after the subsequent write operation.

When the file system generates a PCPI of its active file system, a PCPI fsinfo block 902 is generated as shown in FIG. 9. The PCPI fsinfo block 902 includes a PCPI inode for the inode file 905. The PCPI inode for the inode file 905 is, in essence, a duplicate copy of the inode for the inode file 805 of the file system 800 that shares common parts, such as inodes and blocks, with the active file system. For example, the exemplary file system structure 800 includes the inode file indirect blocks 810, inodes 817, indirect blocks 819 and file data blocks 820A-C as in FIG. 8. When a user modifies a file data block, the file system writes the new data block to disk and changes the active file system to point to the newly created block. FIG. 10 shows an exemplary inode file system structure 1000 after a file data block has been modified. In this example, file data block 820C is modified to file data block 820C'. As a result, the contents of the modified file data block are written to a new location on disk as a function of the exemplary file system. Because of this new location, the indirect block 1019 must be rewritten. Due to this changed indirect block 1019, the inode 1017 must be rewritten. Similarly, the inode file indirect block 1010 and the inode for the inode file 1005 must be rewritten.

Thus, after a file data block has been modified the PCPI inode 905 contains a pointer to the original inode file indirect block 810 which, in turn, contains pointers through the inode 817 and indirect block 819 to the original file data blocks 820A, 820B and 820C. The newly written indirect block 1019 also includes pointers to unmodified file data blocks 820A and 820B. That is, the unmodified data blocks in the file of the active file system are shared with corresponding data blocks in the PCPI file, with only those blocks that have been modified in the active file system being different than those of the PCPI file.

However, the indirect block 1019 further contains a pointer to the modified file data block 820C' representing the new arrangement of the active file system. A new inode for the inode file 1005 is established representing the new structure 1000. Note that metadata (not shown) stored in any PCPI blocks (e.g., 905, 810, and 820C) protects these blocks from being recycled or overwritten until they are released from all PCPIs. Thus, while the active file system inode for the inode file 1005 points to new blocks 1010, 1017, 1019, 820A, 820B and 820C', the old blocks 905, 810 and 820C are retained until the PCPI is fully released.

Restoring One or More Data Containers

Figure 11:
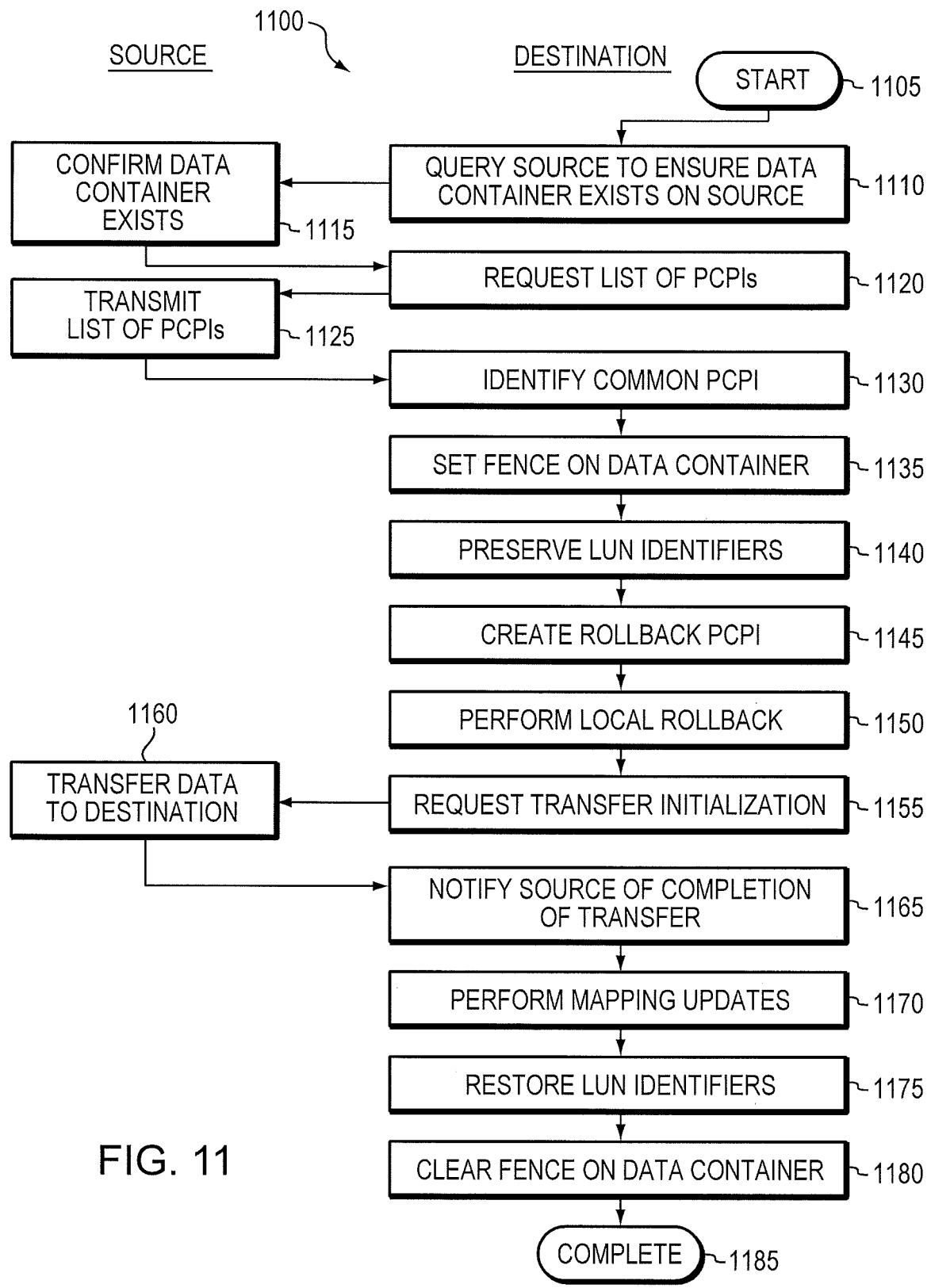
FIG. 11 is a flowchart detailing the steps of a procedure for efficiently restoring one or more data containers.

The description contained herein is written in terms of an aspect relating to restoration of data. However, it should be explicitly noted that the principles may be utilized for other forms of replication. As such, the description of restore operations should be taken as exemplary only. FIG. 11 is a flowchart detailing the steps of a procedure 1100 for restoring one or more data containers in accordance with an example of the present disclosure. The procedure 1100 begins in step 1105 where the procedure is initiated. Illustratively, the procedure 1100 may be initialized by an administrator entering a command to restore one or more data containers. The administrator may be alerted to data corruption of data containers on the destination storage system by, for example, a user informing the administrator. Further, in an alternative aspect of the disclosure, the restoration of one or more data containers may be automatically initialized as a result of an automated file system consistency checking operation. Certain file systems 260 may implement a consistency check operation that may be executed either automatically or invoked by an administrator. The consistency checking operation examines the various inodes, buffer trees, etc. of the file system to ensure that data is consistent, pointers do not point to missing data, etc. In the event that such an automated consistency checking operation detects corrupted data, it may automatically invoke the restoration of the one or more data containers that have been corrupted. Further, it should be noted that while restoration of one or more data containers is described herein, in alternative aspects, only a portion of the data container may be restored. As such, the description of a data container should be read to include those cases where only a portion of the data container is restored or otherwise replicated.

As the restoration procedure 1100 is initialized on the destination, the destination's control module 292 queries the source storage system to ensure that the one or more data containers exist on the source in step 1110. The source control module confirms the existence of the designated one or more data containers in step 1115. That is, the source that the data containers are currently being stored on the source storage system and are available to be restored to the destination storage system.

The destination then requests a list of persistent consistency point images (PCPIs) in step 1120. The source transmits a list of PCPIs associated with the source in step 1125. That is, the destination control module request that the source control module transmit a list of PCPIs that are currently being stored on the source storage system. The destination control module identifies a common PCPI in step 1130. Illustratively, the common PCPI is one that was created prior to the data corruption and that is shared between the source and destination, that is, the same PCPI exists on both the source and the destination. By identifying a PCPI, both the source and the destination may identify a common point in time instantiation of the file system and its associated data containers. This enables storage systems to begin from a common point. It should be noted that while procedure 1100 is written in terms of the destination requesting the source's list of PCPIs, the principles of the disclosure may be utilized with the destination transmitting a list of the destination PCPIs to the source to identify a common PCPI. As such, the description contained herein should be viewed exemplary only.

The destination then sets a fence on the data container in step 1135. Illustratively, the fence causes incoming data access operations to be suspended until the restoration operation is complete. For example, a read request directed to the data container would not be responded to until such time as the restoration operation is complete. Fencing operations are well known in the art and the fence may be implemented using any conventional file system fencing technique. It should be noted that only the data containers, e.g., files/luns, that are being restored are fenced off and unavailable for data access operations. All other data containers on the volume are available for data access operations, e.g., read/write operations. This differs from prior art restoration techniques that render the entire volume as unavailable during the restoration procedure.

If the data container is a lun, the destination's control module then preserves the lun identifiers in step 1140. This may be accomplished by, e.g., storing the lun identifiers in a separate data container (not shown) to be restored at the completion of the restoration procedure 1100. The lun identifiers may be utilized by the destination storage system to respond to certain SCSI operations that are directed to the lun while the restoration is ongoing. A rollback PCPI is created in step 1145. The rollback PCPI provides a point in time image of the file system immediately prior to the restoration process.

A local rollback operation is then performed in step 1150. The destination transfer engine 294 modifies the active file system so that it matches the contents of the common PCPI. Effectively, the state of the data container in the active file system is rolled back to the point in time of the common PCPI.

Figure 12:
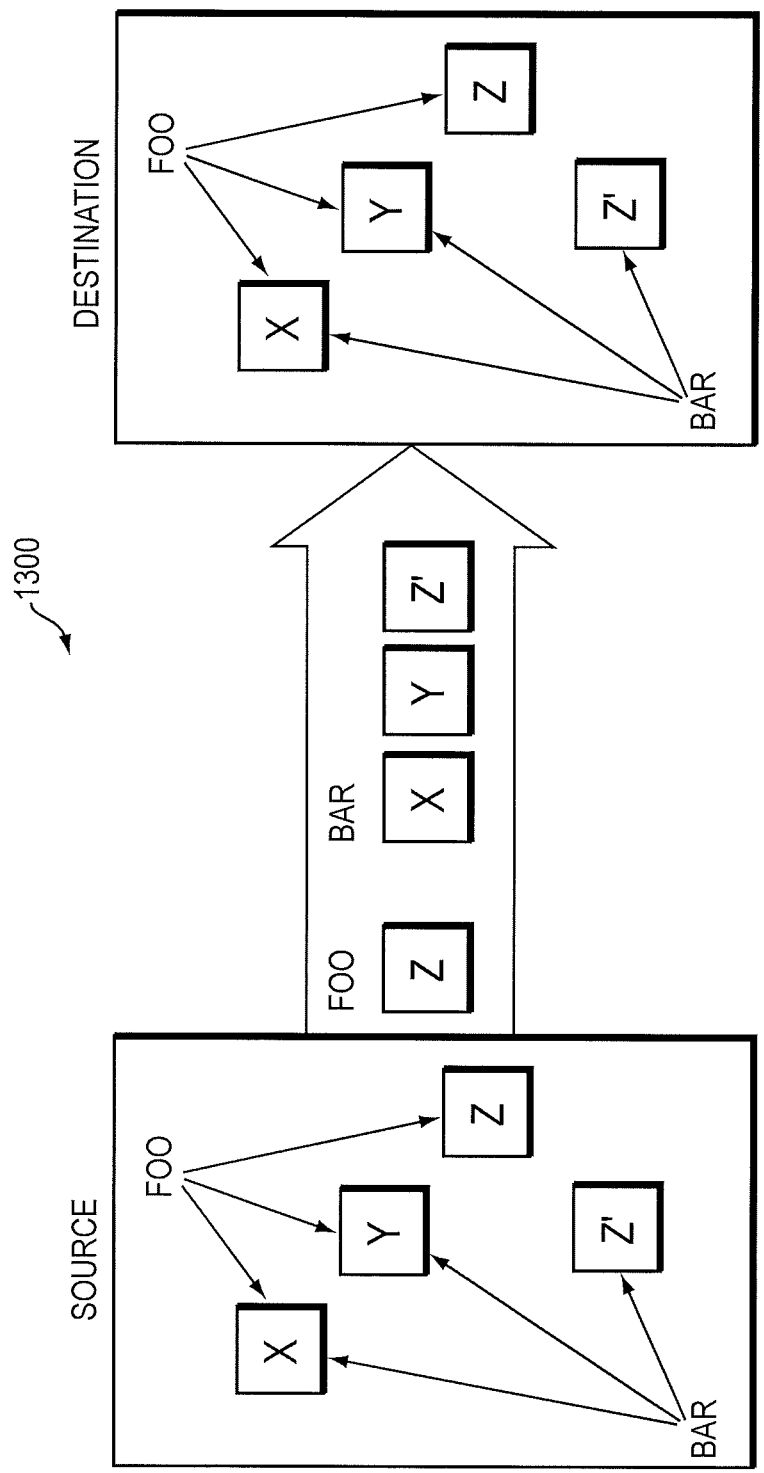
FIG. 12 is a flow diagram showing transmission of data for restoring one or more data containers.
Figure 13:
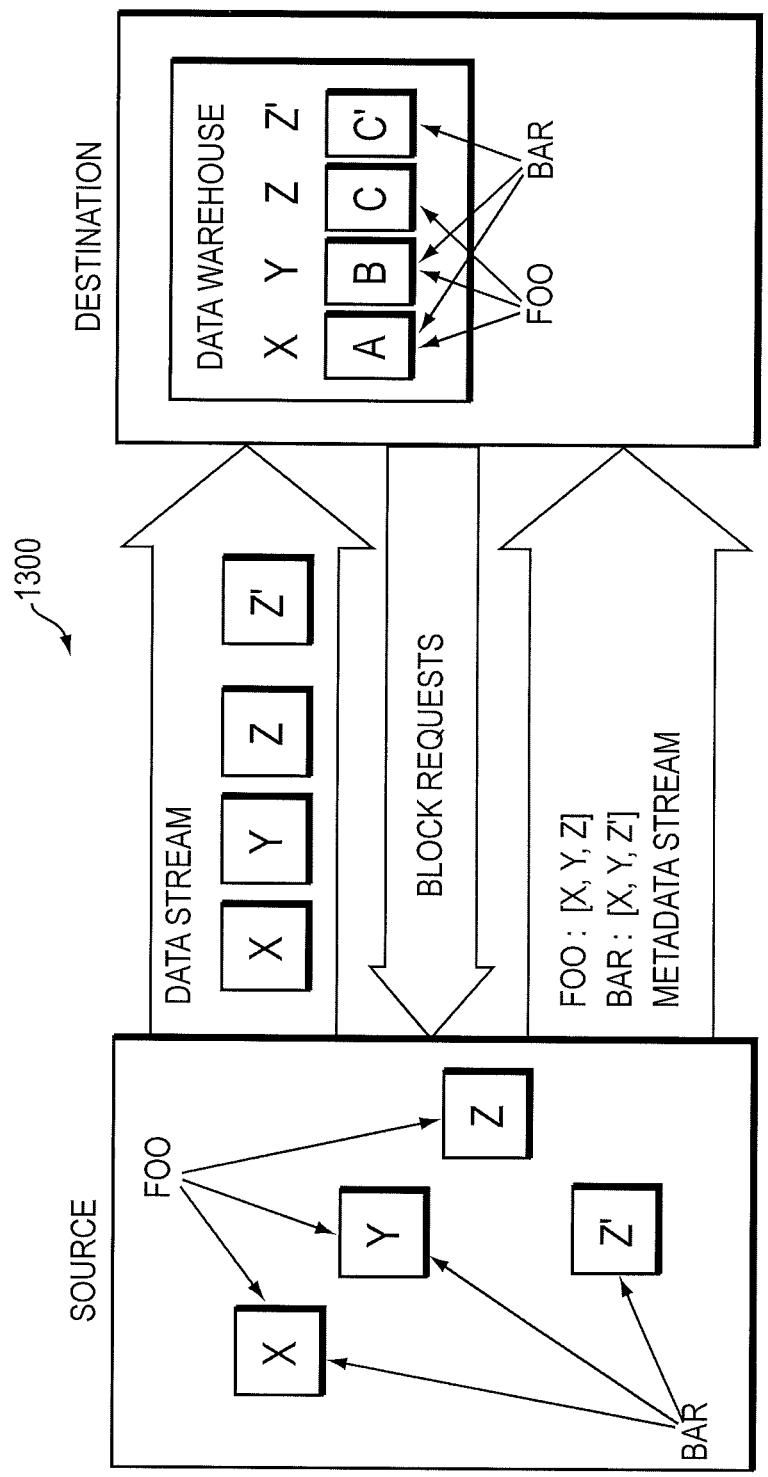
FIG. 13 is a flow diagram showing efficient transmission of data for restoring one or more data containers.

Once the local rollback operation has completed, the destination control module 292 requests the initialization of the data transfer in step 1155. In response, the source transfers data to the destination in step 1160. Described further below, in reference to FIGS. 12 and 13, are two examples of techniques for transmitting data between the source and the destination. While two examples are described, it should be noted that varying techniques may be utilized. As such, the description contained herein should not be viewed as limiting and should be viewed as exemplary only. Illustratively, the transfer of data is performed to preserve storage efficiency. In one aspect, if a plurality of references are made to a single block of data, only one copy of the block is transmitted. Further, if one of the blocks to be transferred is shared with a block on the common PCPI, then a reference is transmitted to the shared block instead of the actual data block. In this way, the need to transmit the shared block over the network is obviated. In accordance with an illustrative embodiment, a deduplication and/or compression engine may be located at the destination to compress and/or perform a data de-duplication procedure on the received data. Such additional storage efficiency procedures may occur as the transfer is ongoing or may be performed once the data transfer has completed.

The source and destination are illustratively configured to enable restart operations should the transfer fail and/or otherwise be interrupted. That is, if the transfer is interrupted and later restarted, the transfer will begin from the point fo the last completed portion of the transfer. This obviates the need to begin from the start of a transfer in cases where error conditions and/or network connectivity problems arise.

Once the destination has received all of the data, it notifies the source of the completion of the transfer in step 1165. The data to be transmitted from the source to the destination illustratively comprises the difference between the data container in the common PCPI and the current state of the data container in the active file system of the source storage system.

Should the data container comprise a lun, the lun identifiers are then restored in step 1170. The fence on the data container is then cleared in step 1175. By clearing the fence, data access operations directed to the data container will now be processed. For example, a previously suspended data access operations that was received during the time with the fence was in place, would now be processed. At this point, the data container has been restored to the destination and the procedure 1100 completes in step 1180. It should be noted that while this description has been written in terms of restoring a data container, the principles contained herein and expanded to cover situations where examples of two or more data containers being restored. As such, description of only a single data container being restored should be taken as exemplary only. The present disclosure enables restoration of one or more data containers.

FIG. 12 is a flow diagram illustrating transfer of data from the source to the destination. Illustratively, a data container FOO has blocks X, Y and Z on the source, while data container BAR has blocks X, Y and Z'. The data stream would consist of blocks X, Y, Z and Z'. Notably, the duplicate data, i.e., blocks X and Y that appear in both FOO and BAR, are not transmitted twice. This helps to ensure efficiency over the network between the source and the destination. In accordance with one aspect of the present disclosure, if a data container exists in the common PCPI, then only those changed blocks are transmitted. Thus, for example, if the common PCPI contained the FOO data container, then only the changed blocks, i.e., Z' would need to be transmitted. This can substantially speed up a restoration process by reducing the amount of data.

FIG. 13 is a flow diagram illustrating an efficient technique for transferring data from the source to the destination. Similar to FIG. 12, data container FOO has blocks X, Y and Z, while BAR has X, Y and Z'. In an alternative embodiment, a metadata stream may be sent that comprises identifier of blocks instead of the blocks themselves. This may be utilized when, e.g., the data block already exists in the common PCPI.

The foregoing description has been directed to specific aspects of the disclosure. It will be apparent, however, that other variations and modifications may be made to the described examples, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the aspects herein. Therefore, it is the object of the appended claims to cover all such variations and modifications as come within the true spirit and scope of the subject matter herein.

What is claimed is:

1. A method comprising:

in response to an automated file system consistency checking operation detecting that a first subset of data containers of a first file system of a first device comprise corrupted data corresponding to inconsistent data, automatically triggering a restoration process to restore the first subset of data containers;

automatically setting a fence on the first subset of data containers based upon the restoration process being triggered;

suspending operations directed to the first subset of data containers based upon the fence being set and until the restoration process has completed and the fence is cleared, wherein operations directed to a second subset of data containers within the first file system are allowed while the fence is set;

modifying, as part of the restoration process, the first file system so that content of the first subset of data containers matches content of a common image created prior to the first subset of data containers becoming corrupted and corresponds to a common time of instantiation of the first file system and a second file system of a second device;

overwriting the content of the first subset of data containers with a content difference transferred from the second file system and corresponding to a difference between content of the common image and content of the second file system to complete the restoration process, wherein the overwriting comprises:

in response to determining that the content difference comprises multiple instances of a block of data referenced by multiple files, transferring a single instance of the block of data from the second device to the first device for overwriting the content of the first subset of data containers; and clearing the fence in response to the restoration process completing, wherein the operations directed to the first subset of data containers are unsuspended and processed in response to the fence being cleared.

2. The method of claim 1, further comprising, as part of the restoration process:

enabling restart of a transfer of the content difference, from the second device to the first device, from a point corresponding to a last completed portion of the content difference being transferred.

3. The method of claim 1, further comprising preserving a set of logical unit number identifiers prior to creating a rollback image on the first device before performing the restoration process.

4. The method of claim 3, further comprising restoring the set of logical unit identifiers after the data has been received from the second device.

5. The method of claim 1, wherein a suspended read operation is unsuspended and processed based upon the restoration process completing.

6. The method of claim 1, wherein a suspended write operation is unsuspended and processed based upon the restoration process completing.

7. The method of claim 1, comprising:

processing a write operation directed to a non-fenced data container within the first file system during the restoration process and while the fence is set.

8. The method of claim 1, wherein compression of the content difference, received from the second device, is retained.

9. The method of claim 1, wherein data deduplication of the content difference, received from the second device, is maintained.

10. A computing device comprising:

a memory comprising machine executable code; and a processor coupled to the memory, the processor configured to execute the machine executable code to cause the processor to:

in response to an automated file system consistency checking operation detecting that a first subset of data containers of a first file system of a first device comprise corrupted data corresponding to inconsistent data, automatically trigger a restoration process to restore the first subset of data containers;

automatically set a fence on the first subset of data containers based upon the restoration process being triggered;

suspend operations directed to the first subset of data containers based upon the fence being set and until the restoration process has completed and the fence is cleared, wherein operations directed to a second subset of data containers within the first file system are allowed while the fence is set;

modify, as part of the restoration process, the first file system so that content of the first subset of data containers matches content of a common image created prior to the first subset of data containers becoming corrupted and corresponds to a common time of instantiation of the first file system and a second file system of a second device;

overwrite the content of the first subset of data containers with a content difference transferred from the second file system and corresponding to a difference between content of the common image and content of the second file system to complete the restoration process, comprising:

in response to determining that the content difference comprises multiple instances of a block of data referenced by multiple files, transfer a single instance of the block of data from the second device to the first device for overwriting the content of the first subset of data containers; and clear the fence in response to the restoration process completing, wherein the operations directed to the first subset of data containers are unsuspended and processed in response to the fence being cleared.

11. The computing device of claim 10, wherein the first subset of data containers comprises a first file, and wherein the machine executable code causes the processor to deny access to the first file and allow access to other files and luns within the first file system while the fence is set.

12. The computing device of claim 10, wherein the machine executable code causes the processor to process requests directed to data of the first file system other than the first subset of data containers while the fence is set.

13. The computing device of claim 10, wherein the content difference comprises changes between the second subset of data containers and the common image.

14. The computing device of claim 13, wherein the content difference comprises an identifier of a first block of data existing in the common image.

15. The computing device of claim 13, wherein the content difference comprises an identifier of a first block of data previously transmitted from the second device to the first device.

16. The computing device of claim 10, wherein the machine executable code causes the processor to store a set of lun identifiers prior to creating a rollback image on the first device before performing the restoration process.

17. The computing device of claim 16, wherein the machine executable code causes the processor to restore the set of lun identifiers after the content difference has been received.

18. The computing device of claim 10, wherein compression of the content difference, received from the second device, is retained.

19. The computing device of claim 10, wherein data deduplication of the content difference, received from the second device, is maintained.

20. A non-transitory computer readable medium comprising program instructions, which when executed by a processor, causes the processor to:

in response to an automated file system consistency checking operation detecting that a first subset of data containers of a first file system of a first device comprise corrupted data corresponding to inconsistent data, automatically trigger a restoration process to restore the first subset of data containers;

automatically set a fence on the first subset of data containers based upon the restoration process being triggered;

suspend operations directed to the first subset of data containers based upon the fence being set and until the restoration process has completed and the fence is cleared, wherein operations directed to a second subset of data containers within the first file system are allowed while the fence is set;

modify, as part of the restoration process, the first file system so that content of the first subset of data containers matches content of a common image created prior to the first subset of data containers becoming corrupted and corresponds to a common time of instantiation of the first file system and a second file system of a second device;

overwrite the content of the first subset of data containers with a content difference transferred from the second file system and corresponding to a difference between content of the common image and content of the second file system to complete the restoration process, comprising:

in response to determining that the content difference comprises multiple instances of a block of data referenced by multiple files, transfer a single instance of the block of data from the second device to the first device for overwriting the content of the first subset of data containers; and clear the fence in response to the restoration process completing, wherein the operations directed to the first subset of data containers are unsuspended and processed in response to the fence being cleared.

* * * * *